(12) United States Patent
Belt (10) Patent No.: US 8,724,784 B2
(45) Date of Patent: May 13, 2014

(54) SYSTEM AND APPARATUS FOR TRANSMITTING CALLER IDENTIFICATION INFORMATION

(75) Inventor: David C. Belt, Morrison, CO (US)

(73) Assignee: EchoStar Technologies L.L.C., Englewood, CO (US)

(\*) Notice: Subject to any disclaimer, the term of this patent is extended or adjusted under 35 U.S.C. 154(b) by 907 days.

(21) Appl. No.: 12/420,918

(22) Filed: Apr. 9, 2009

(65) Prior Publication Data

US 2010/0260328 A1 Oct. 14, 2010

(51) Int. Cl.
*H04M 15/06* (2006.01)
*H04M 3/42* (2006.01)

(52) U.S. Cl.
USPC .................................. 379/142.04; 455/415

(58) Field of Classification Search
USPC ............................ 379/142.04–142.08, 102.03
See application file for complete search history.

(56) References Cited

U.S. PATENT DOCUMENTS

| | | | | |
|---|---|---|---|---|
| 5,937,038 | A * | 8/1999 | Bell et al. | 379/93.17 |
| 6,707,893 | B1 * | 3/2004 | Basore et al. | 379/93.23 |
| 7,184,522 | B2 * | 2/2007 | Brunelle et al. | 379/88.17 |
| 7,499,704 | B1 * | 3/2009 | Bonner | 455/435.1 |
| 7,515,698 | B2 * | 4/2009 | Van Wyk et al. | 379/142.16 |
| 7,620,058 | B2 * | 11/2009 | Gorti et al. | 370/401 |
| 7,647,617 | B2 * | 1/2010 | Bartfeld et al. | 725/122 |
| 8,009,812 | B2 * | 8/2011 | Bruce et al. | 379/88.13 |
| 8,149,821 | B2 * | 4/2012 | Cassanova | 370/352 |
| 8,442,505 | B1 * | 5/2013 | Bluhm et al. | 455/415 |
| 8,509,412 | B2 * | 8/2013 | Sheha et al. | 379/207.12 |
| 8,526,583 | B2 * | 9/2013 | Burns, Jr. | 379/88.21 |
| 2004/0083493 | A1 * | 4/2004 | Swisher et al. | 725/106 |
| 2004/0176142 | A1 | 9/2004 | Thrasher | |
| 2007/0263853 | A1 * | 11/2007 | Pearson et al. | 379/413.03 |
| 2007/0274486 | A1 * | 11/2007 | Kister | 379/142.06 |
| 2008/0298570 | A1 | 12/2008 | Wang | |
| 2009/0028307 | A1 * | 1/2009 | Kister et al. | 379/93.03 |
| 2009/0328118 | A1 * | 12/2009 | Ravishankar et al. | 725/106 |
| 2010/0046729 | A1 * | 2/2010 | Bifano et al. | 379/201.12 |
| 2010/0330970 | A1 * | 12/2010 | Skog et al. | 455/415 |

OTHER PUBLICATIONS

Integrated Device Technology Inc., "NW6005 Enhanced Type II Caller ID Decoder", www.datasheetcatalog.com, 2002.
Dish Network Training and Development, "DishCOMM Modem user manual", Jan. 28, 2008, http://www.trainhpts.com/Trainhpts/Dish%20Alerts%20and%20updates/20080128_DishCOMM_DN.pdf.

\* cited by examiner

*Primary Examiner* — Fan Tsang
*Assistant Examiner* — Solomon Bezuayehu
(74) *Attorney, Agent, or Firm* — Ingrassia Fisher & Lorenz, P.C.

(57) ABSTRACT

Described herein are techniques for extracting caller identification information during a phone call and transmitting the caller identification information over a network to another device that presents the caller identification information to a user. An apparatus includes a first communication interface communicatively coupled to a telephone network and a second communication interface communicatively coupled to a communication network. The apparatus receives a phone call, extracts caller identification data, and transmits the caller identification data to another device over the communication network.

17 Claims, 7 Drawing Sheets

SYSTEM AND APPARATUS FOR TRANSMITTING CALLER IDENTIFICATION INFORMATION

BACKGROUND

In pay television distribution systems, such as direct satellite broadcast systems, television receivers (also known as set-top boxes) are often connected to a telephone network in order to exchange data with a central data collection server. Additionally, satellite television receivers are often configured to display caller identification information to users via an associated television. Thus, the user can see who is calling while watching television and decide whether to answer the call without getting up to look at the telephone. However, many satellite television receivers are not connected to a telephone line for various reasons, often because a telephone line is not readily available proximate the location of the television receiver. Therefore, the user is unable to view caller identification information on their television and getting up to view the telephone may interrupt the user's viewing of programming.

BRIEF DESCRIPTION OF THE DRAWINGS

The same number represents the same element or same type of element in all drawings.

DETAILED DESCRIPTION

Described herein are systems, methods and apparatus for presenting caller identification information to a user. More particularly, described herein are techniques for extracting caller identification information during a phone call and transmitting the caller identification information over a network to another device that presents the caller identification information to a user. In short, described herein is a network based caller identification generator.

In at least one embodiment, an apparatus is provided for receiving caller identification information from a telephone network and transmitting the caller identification information to a network connected receiving device. The apparatus includes a first communication interface communicatively coupled to a telephone network to receive a phone call. For example, the first communication interface may be communicatively coupled to a telephone wall jacket in a home through an RJ-11 connection. The apparatus further includes a second communication interface that communicatively couples to a communication network to communicate with a receiving device. For example, the second communication interface and the receiving device may be communicatively coupled over a local area network using a universal plug and play (UPnP) communication protocol. The apparatus further includes control logic operable to process a phone call received by the first communication interface to extract caller identification information, generate a message based on the caller identification information and initiate transmission of the message to the receiving device via the second communication interface. The receiving device receives the message from the second communication interface and responsively outputs the caller identification information to a user.

The techniques described herein will be described in the context of transmitting caller identification information to a television receiver, such as a satellite, cable, terrestrial or internet protocol television (IPTV) receiver which outputs the caller identification information for presentation by an associated display device. However, it is to be appreciated that the receiving device may be embodied as any type of network connected device capable of receiving messages and outputting information to a user based on a received message. For example, the receiving device may comprise any type of household appliance, such as a microwave, stove, washing machine, dryer, refrigerator, clock, computer and the like capable of presenting information to a user. Further, the information presented to the user may be outputted by the receiving device in audible or visual form. For example, a microwave may display caller identification information via an integrated display in textual form or a clock radio may present caller identification information via an integrated speaker system in spoken form. In at least one embodiment, the receiving device may be operable to receive other types of data from an external network. For example, a television receiver may be operable to download videos from the internet. In another embodiment, the receiving device may be a clock operable to synchronize its time with an external server.

Figure 1:
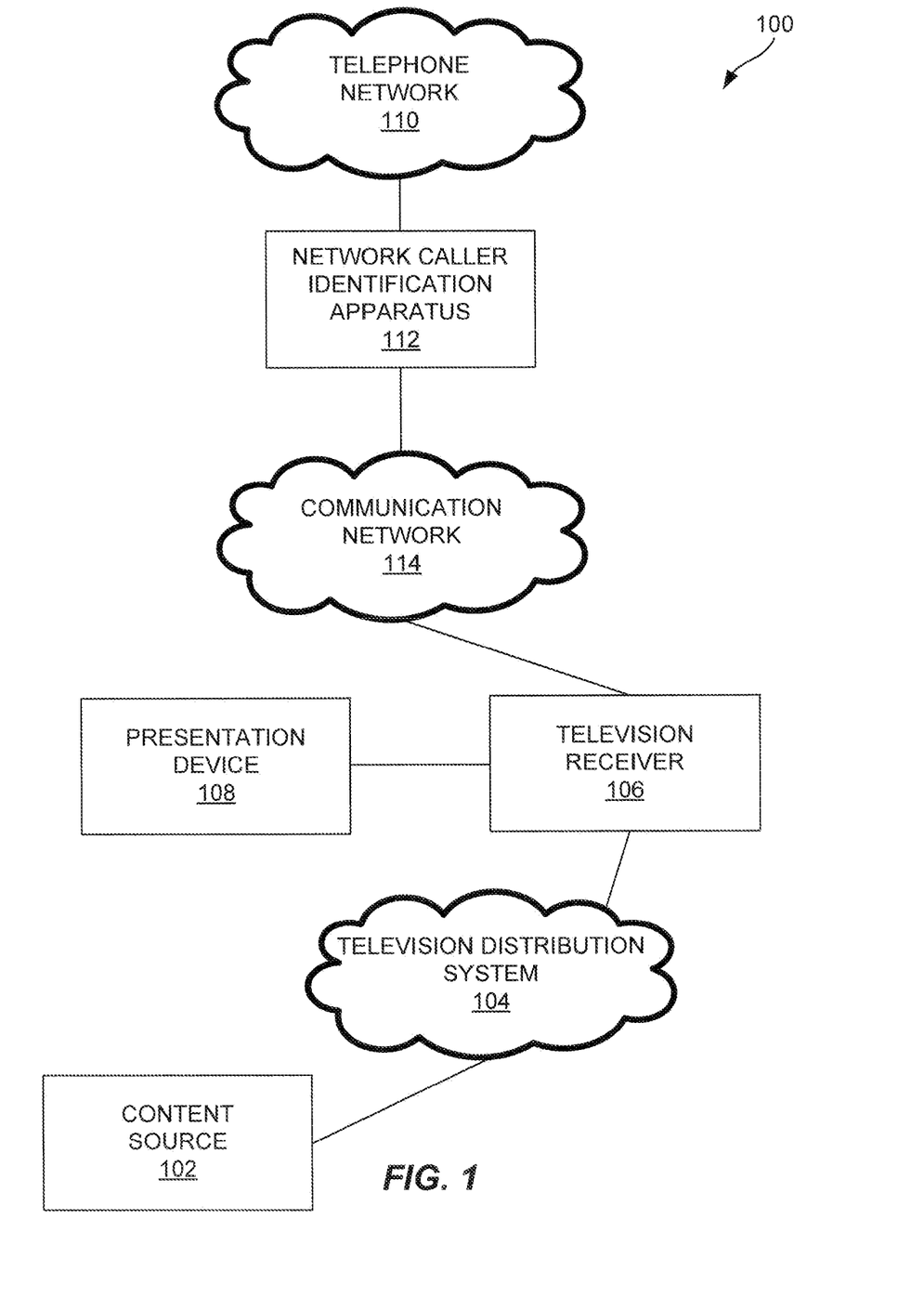
FIG. 1 illustrates an embodiment of a communication network.

FIG. 1 illustrates an embodiment of a communication network 100. The communication network 100 includes a content source 102, a television distribution system 104, a television receiver 106, a presentation device 108, a telephone network 110, a network caller identification apparatus (NCIA) 112 and a communication network 114. Each of these elements will be discussed in greater detail below. Further, the communication network 100 may include other elements, components and/or devices not illustrated for the sake of brevity.

The content source 102 is operable for receiving, generating and communicating content to one or more television receivers 106. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the television receiver 106. It is to be appreciated that the content source 102 may receive practically any form and/or type of information from one or more sources including streaming television programming, recorded audio or video, electronic programming guide data and the like. Exemplary content sources 102 include television distribution systems (e.g., over-the-air transmission facilities, cable television distribution head-ends and satellite television uplink centers), broadband or internet servers and the like.

The television distribution system 104 is operable to transmit content from the content source 102 to the television receiver 106. The television distribution system 104 may comprise any type of wired (e.g., cable and fiber) and/or wireless (e.g., cellular, satellite, microwave, and other types of radio frequency) communication mediums and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers, e.g., television. receiver 106. The television distribution system 104 may also distribute content to a specific addressable television receiver 106, such as video-on-demand content and the like. In at least one embodiment, the content source 102 may be embodied as a transmission facility of the television distribution system 104. Exemplary content sources 102 include over-the-air (OTA) terrestrial transmission facilities, cable television distribution head-ends, satellite television uplink centers, broadband or internet servers and the like.

The television receiver 106 is operable to receive content from the content source 102 and output the received content for presentation by the presentation device 108. In at least one embodiment, the presentation device 108 is a display device (e.g., a television) configured to display content to a user. The television receiver 106 may receive an audio/video stream in any format (e.g., analog or digital format) and output the audio/video stream for presentation by the presentation device 108. For example, the television receiver 106 may be a satellite, cable, over-the-air, broadband or other type of television receiver that receives and demodulates television signals that are outputted for display on a display device (e.g., a television). As used herein, a television receiver may also be referred to as a set-top box, which is a television receiver that is located externally with respect to a display device. The television receiver 106 may be further configured to output menus and other information that allow a user to control the output of video content by the television receiver 106. In some embodiments, the television receiver 106 and the presentation device 108 may be integrated as a device combining the functionality of a display device and a set-top box, digital video recorder (DVR) or the like.

The NCIA 112 and other communication devices, such as wired telephones, are communicatively coupled to the NCIA 112. The telephone network 110 may comprise any type of telephone network, such as a public switched telephone network (PSTN). For example, the telephone network 110 may provide plain old telephone service (POTS) to the telephone network 110. However, it is to be appreciated that other types of telephone networks may also be utilized.

The NCIA 112 is communicatively coupled to the television receiver 106 through the communication network 114. In at least one embodiment, the communication network 114 may comprise a local area network (LAN), such as an Ethernet network. The communication network 114 may comprise any combination of wired and wireless connections that communicatively couple the NCIA 112 and the television receiver 106. Further, the communication network 114 may utilize any type of communication protocol, such as UPnP, HTTP, TCP/IP and the like depending on desired design criteria. In at least one embodiment, the communication network 114 communicatively couples the television receiver 106 to other devices, such as other television receivers 106, personal computers, video servers, wireless televisions, external servers accessed over the internet and the like. In some embodiments, the NCIA 112 may be communicatively coupled to other devices over the communication network 114, such as household appliances.

The NCIA 112 is operable to process a received phone to extract caller identification information. The caller identification information is then transmitted over the communication network 114 to compatible devices, such as the television receiver 106, which output the caller identification information to a user via the presentation device 108. Thus, the user may view caller identification information on the presentation device 108 even if the television receiver 106 is not connected to the telephone network 110.

The NCIA 112 and the television receiver 106 are operable to communicate using a common protocol. In at least one embodiment, the common protocol may be any protocol used to communicate over an IP based network. For example, Ethernet, WiFi, Homeplug, and Moca and exemplary embodiments of IP based networks. In at least one embodiment, the NCIA 112 is coupled to the communication network 114 and transmits a discovery message to other devices on the communication network 114, such as the television receiver 106. As part of the discovery process, the NCIA 112 identifies the communication service offered by the NCIA 112 in messages sent to other devices. More particularly, the NCIA 112 identifies that other devices may receive caller identification information from the NCIA 112. The other devices, such as the television receiver 106, process the message to determine whether the device is capable of utilizing the caller identification information. If the television receiver 106 is capable of utilizing the caller identification information, then the television receiver 106 transmits a registration message to the NCIA 112 requesting the communication service from the NCIA 112. If new devices are coupled to the communication network 114, then a similar discovery process may proceed between the NCIA 112 and the new device to determine whether to transmit caller identification information between the NCIA 112 and the new device.

Figure 2:
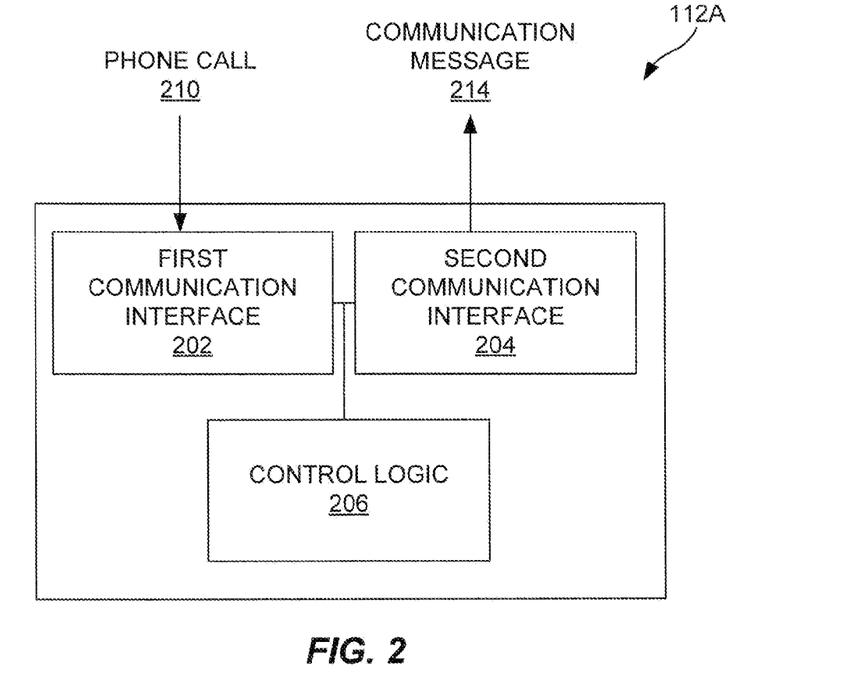
FIG. 2 illustrates an embodiment of the network caller identification apparatus (NCIA) of FIG. 1.

FIG. 2 illustrates an embodiment of the NCIA 112 of FIG. 1. FIG. 2 will be discussed in reference to communication network 100 of FIG. 1. The NCIA 112A of FIG. 2 includes a first communication interface 202, a second communication interface 204 and control logic 206. Each of these components is discussed in greater detail below. The NCIA 112 may include other components, elements or devices not illustrated for the sake of brevity.

The first communication interface 202 is operable to communicatively couple to the telephone network 110 (see FIG. 1) to receive a phone call 210. In at least one embodiment, the first communication interface 202 is embodied as an RJ-11 connector operable to receive POTS from the telephone network 110. In some embodiments, the first communication interface 202 may be embodied as other types of interfaces operable to communicatively couple to other types of telephone networks.

The second communication interface 204 is operable to communicatively couple to the communication network 114 to communicate with the television receiver 106 and/or other devices on the communication network 114. In at least one embodiment, the second communication interface 204 is a wired Ethernet connection, such an RJ-45 connector or a network interface card. In some embodiments, the second communication interface 204 may be embodied as a wireless transceiver, such as a WiFi transceiver. The second communication interface 204 may be operable to communicate using any type of communication protocol, such as UPnP, TCP/IP, HTTP and the like.

The control logic 206 is operable to control the operation of the NCIA 112A. The control logic 206 may be a single processing device or a plurality of processing devices that cooperatively operate to control the operation of the NCIA 112A. The control logic 206 may include various components or modules for communicating over telephone and data networks. The control logic 206 may initiate/receive transmissions through the first and second communication interfaces 202 and 204 using any appropriate communication protocol. For example, the control logic 206 may operate Ethernet and UPnP communication stacks for communicating with the television receiver 106.

In at least one embodiment, when the NCIA 112A is initially coupled to the communication network 114, the second communication interface 204 transmits a discovery announcement using the standard UPnP protocol. The discovery announcement may identify communication services offered by the NCIA 112A, e.g., the availability of caller identification information from the NCIA 112A. Devices capable of receiving the caller identification information register with the NCIA 112A to receive the communication service by transmitting a response to the announcement message. The reply message may include information identifying the replying device, e.g., the television receiver 106 so that the NCIA 112A may subsequently communicate with the television receiver 106.

Responsive to a phone call 210 received by the first communication interface 202 the control logic 206 extracts the caller identification information from the phone call 210. The control logic 206 then identifies any devices for which the caller identification information should be transmitted to and generates a communication message 214. The control logic 206 then initiates transmission of the communication message 214 to the identified device, e.g., the television receiver 106 through the communication network 114. If multiple devices have registered to receive the communication service, then the control logic 206 may initiate transmission of multiple communication messages 214 to the devices, each message addressed to a different communication device on the communication network 114. As previously described, a receiving device, e.g., the television receiver 106, receives the communication message 214 and outputs the caller identification information to a user. For example, the television receiver 106 may output the caller identification information overlaid onto television programming which is presented by the presentation device 108.

Figure 3:
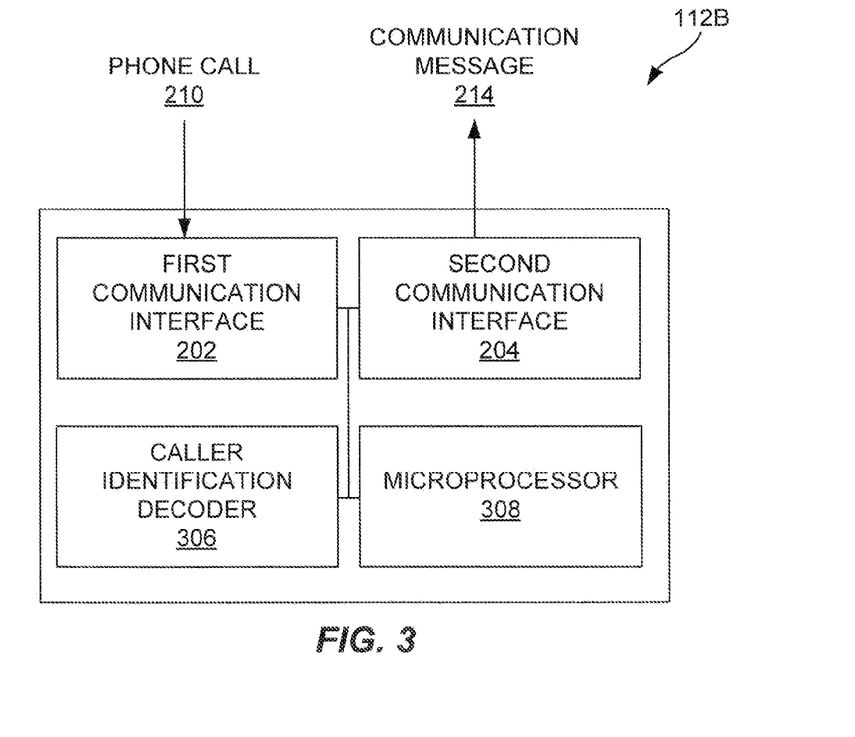
FIG. 3 illustrates another embodiment of the NCIA of FIG. 1.

FIG. 3 illustrates another embodiment of the NCIA 112 of FIG. 1. FIG. 3 will be discussed in reference to the communication network 100 of FIG. 1. The NCIA 112B of FIG. 3 includes a first communication interface 202, a second communication interface 204, a caller identification decoder 306 and a microprocessor 308. Each of these components is discussed in greater detail below. The NCIA 112 may include other components, elements or devices not illustrated for the sake of brevity and the description of components common to FIG. 2 is omitted herein.

The caller identification decoder 306 is operable to extract caller identification information from the phone call 210 received by the second communication interface 204. The caller identification decoder 306 operates to decode the caller identification information modulated within the phone call 210. One exemplary caller identification decoder is the NW6005 chip manufactured by IDT Corp. of Santa Clara, Calif. The NW6005 chip operates to output the caller identification information to another device via a serial interface.

The microprocessor 308 is operable to control the operation of the NCIA 112B. The microprocessor 308 is operable to communicate with other devices over the communication network 114 using standard protocols, such as Ethernet and UPnP, as described above. In at least one embodiment, the microprocessor 308 is communicatively coupled to the caller identification decoder 306 using a serial interface. The microprocessor 308 receives the caller identification information, generates a message and initiates transmission of the message to the television receiver 106 (and/or other devices) through the communication interface 204.

Figure 4:
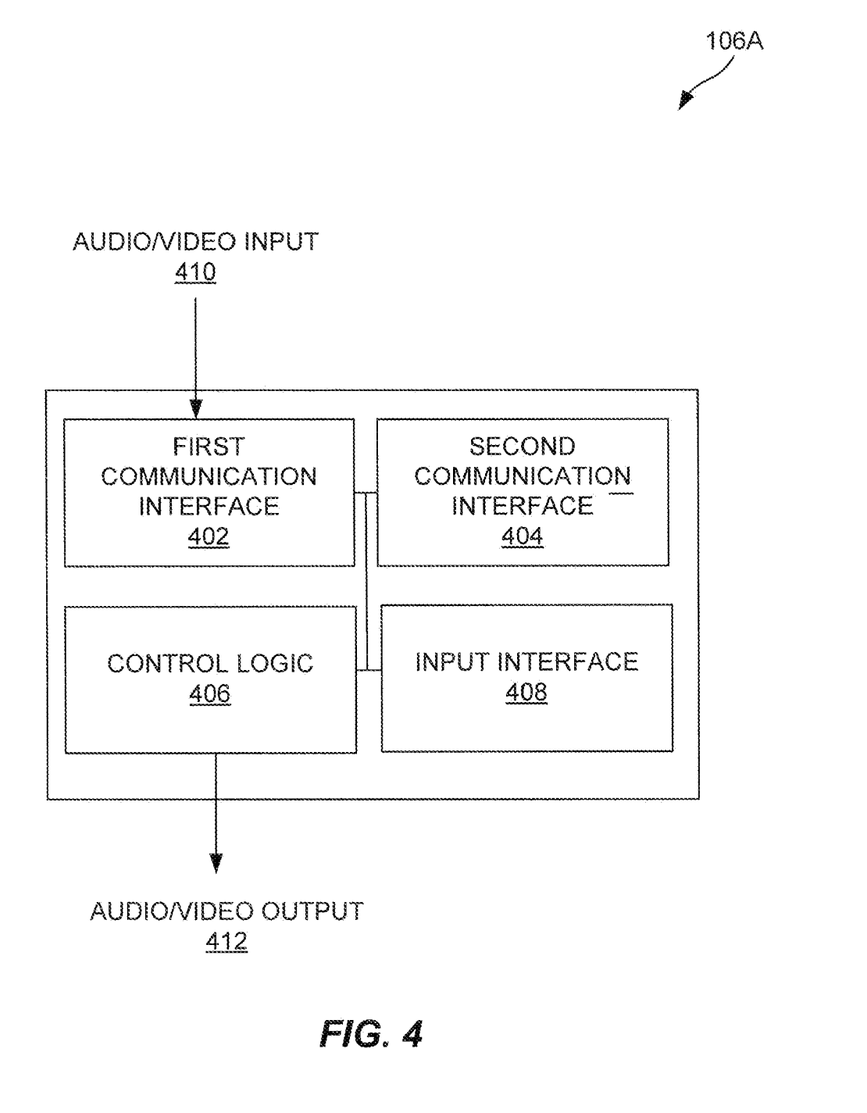
FIG. 4 illustrates an embodiment of the television receiver of FIG. 1.

FIG. 4 illustrates an embodiment of a television receiver of FIG. 1. FIG. 4 will be discussed in reference to the communication network 100 illustrated in FIG. 1. The television receiver 106A includes a first communication interface 402, a second communication interface 404, control logic 406 and an input interface 408. Each of these components will be discussed in greater detail below. The television receiver 106A may include other elements, components or devices which are not illustrated for the sake of brevity.

The first communication interface 402 is operable to receive an audio/video input 410 from the content source 102. More particularly, in at least one embodiment, the first communication interface 402 receives and tunes a television signal including television programming. The first communication interface 402 may receive an over-the-air (OTA) broadcast, a direct broadcast satellite signal, a cable television signal or an internet protocol television (IPTV) signal and tune the audio/video input 410 to extract the selected television programming. In at least one embodiment, the first communication interface 402 may comprise multiple tuners, utilized by the television receiver 106A to output and/or record multiple television programs simultaneously.

The second communication interface 404 is operable to communicate with devices over the communication network 114. For example, the second communication interface 404 may communicate with the NCIA 112. In at least one embodiment, the second communication interface 404 may be operable to perform discovery operations, such as in accordance with the UPnP protocol. For example, the second communication interface 404 may be operable to receive discovery requests from other devices, such as the NCIA 112 and respond accordingly. In at least one embodiment, a response to the NCIA 112 includes requesting a communication service offered by the NCIA 112. The second communication interface 404 may be operable to receive other data, such as videos downloaded from intranet or internet servers or caller identification information from the NCIA 112.

The input interface 408 is operable to wirelessly receive data from a remote control (not shown in FIG. 4). The input interface 408 may communicate with a remote control utilizing any type of IR or RF communication link. In at least one embodiment, the input interface 408 receives a key code from a remote control and responsively provides the key code to the control logic 406 for processing. In some embodiments, the input interface 408 may receive positional information from a scrolling device of the remote control, e.g., a touch pad, scroll wheel or the like. The data received from the remote control may be utilized by the control logic 406 to control the output of content by the control logic 406. Some of the data received by the input interface 408 may request to view electronic programming guide data, menus and the like.

The control logic 406 is operable to control the operation of the television receiver 106A. The control logic 406 may be a single processing device or a plurality of processing devices that cooperatively operate to control the operation of the television receiver 106A. The control logic 406 may include various components or modules for processing and outputting audio/video content. Exemplary components or modules for processing audio/video content include a demodulator, a decoder, a decompressor, a conditional access module and a transcoder module.

In at least one embodiment, the control logic 406 receives caller identification data from the NCIA 112 via the second communication interface 404. The control logic is operable to overlay the caller identification information onto video content in the audio/video output 412. Thus, the presentation device 108 presents the audio/video output 412, including the caller identification information, for viewing by a user.

Figure 5:
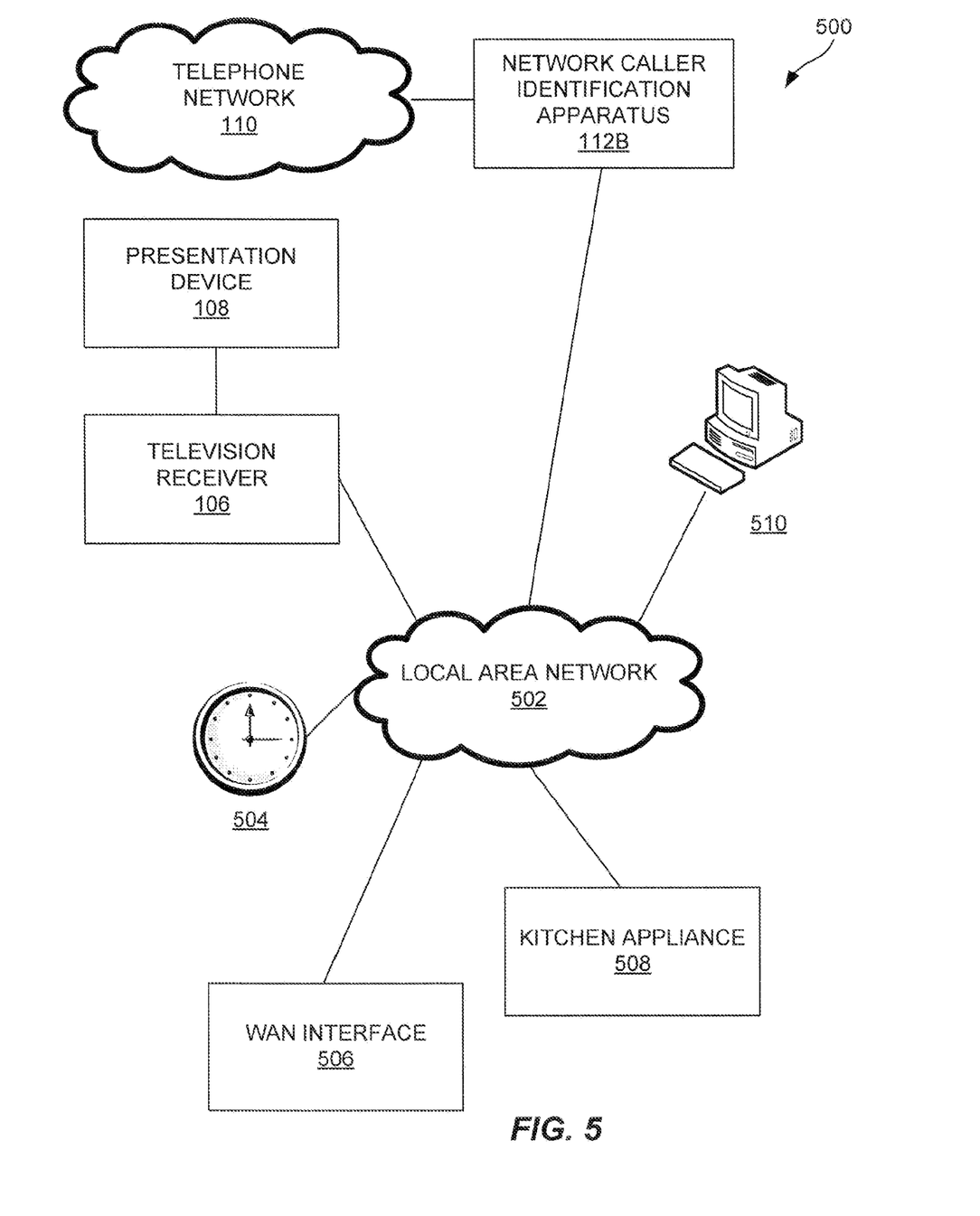
FIG. 5 illustrates another embodiment of a communication network.

While the NCIA 112B has previously been described as communicating with a single connected device, the NCIA 112B may transmit caller identification information to multiple devices communicatively coupled to a communication network. FIG. 5 illustrates another embodiment of a communication network 500. The communication network 500 includes a television receiver 106, a presentation device 108, a telephone network 110, an NCIA 112B, a local area network (LAN) 502, a clock 504, a wide area network (WAN) interface 506, a kitchen appliance 508 and a computer 510. Each of these components is discussed in greater detail below. The communication network 500 may include other components, elements or devices not illustrated for the sake of brevity and the discussion of components common to FIGS. 1-3 is omitted herein.

The LAN 502 is operable to communicatively couple various devices, such as the television receiver 106, the clock 504, the WAN interface 506, the kitchen appliance 508 and the computer 510. The LAN 502 may include various components, such as routers, cabling and the like to communicatively couple the aforementioned devices. The LAN 502 may utilize any type of appropriate communication protocol to route traffic between various devices. In at least one embodiment, the LAN 502 utilizes the Ethernet protocol to route traffic between the various devices of the LAN 502.

The WAN interface 506 is operable to communicatively couple at least a portion of the devices of the LAN 502 to an external network. For example, the WAN interface 506 may be a cable modem, DSL modem or other type of gateway that communicatively couples the LAN 502 to an external network. In at least one embodiment, the LAN 502 and the WAN interface 506 communicatively couple the television receiver 106 with an external video server over the internet In some embodiments, the WAN interface 506 is integrated with a router of the LAN 502.

The clock 504, the computer 510, the television receiver 106 and the kitchen appliance 508 are examples of various devices which may be configured to receive and display caller identification information from the NCIA 112B. For example, a television receiver 106 may output caller identification information overlaid on an output video stream presented by the presentation device 108 as previously described. A clock 504 may output caller identification information on a display screen or via an integrated speaker system. A computer 510 may output caller identification information on screen or via associated speakers. Further, various kitchen appliances 508 and other household appliances, such as stoves, microwaves, ovens, refrigerators, dish washers, washing machines, dryers and the like may present caller identification information via integrated display screens or other presentation devices, e.g., speakers. It is to be appreciated that any type of network coupled device capable of receiving caller identification information and presenting the same may be utilized in accordance with the teachings described herein.

During a discovery process, the NCIA 112B transmits a message identifying the communication service available from the NCIA 112B to various devices on the LAN 502. For example, a UPnP protocol may be utilized for the NCIA 112B to discover devices on the LAN 502. Devices which are capable of receiving the caller identification information respond in kind requesting the communication service from the NCIA 112B. For example, the television receiver 106 and the clock 504 may request the communication service from the NCIA 112B in one embodiment.

When a phone call is received, the NCIA 112B extracts the caller identification information and transmits messages to devices which have requested the caller identification information. For example, the NCIA 112B may transmit the caller identification information to the television receiver 106 and the clock 504 in one or more messages. Each device may then process the caller identification information and output the same for viewing by a user.

Figure 6:
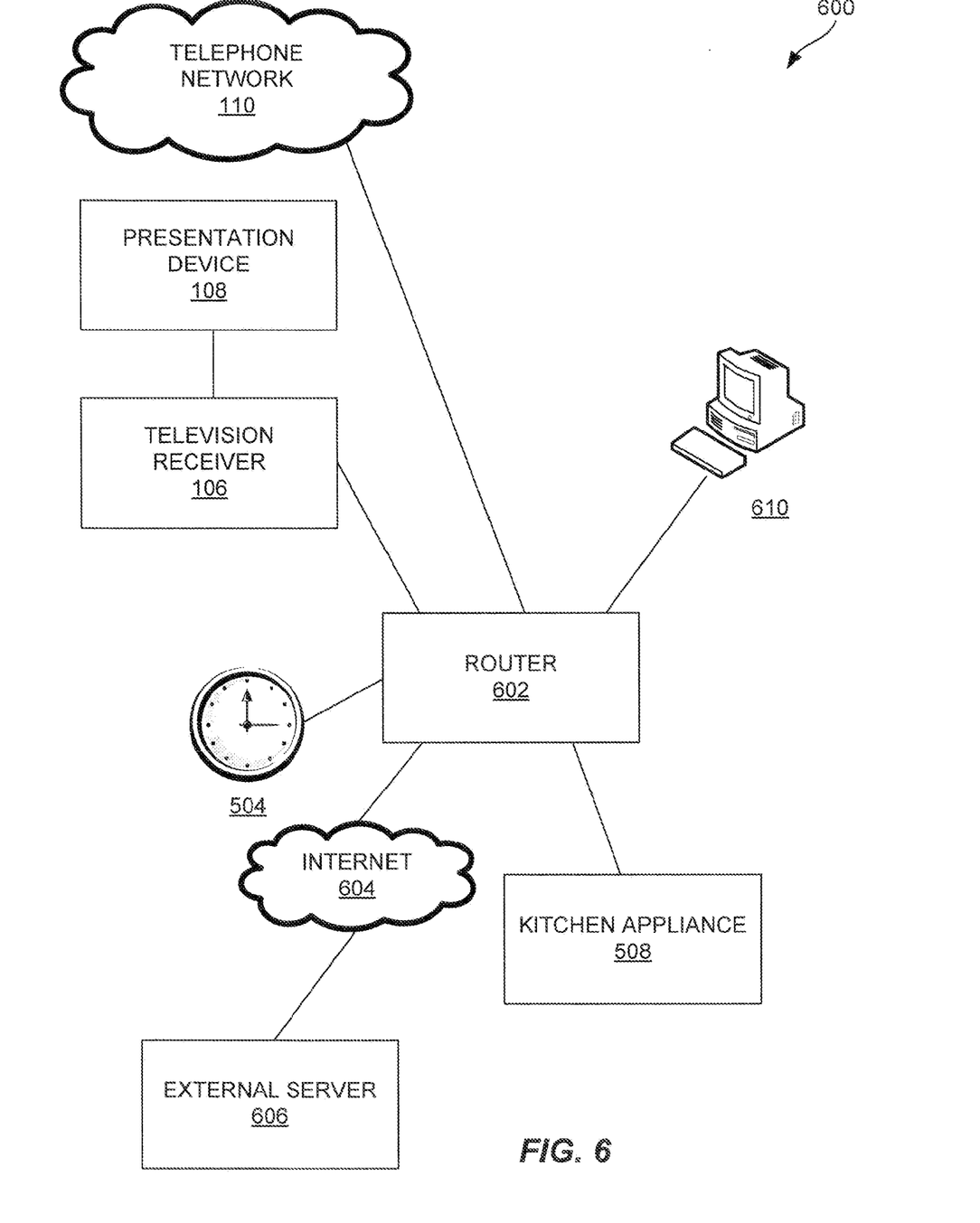
FIG. 6 illustrates another embodiment of a communication network.

In at least one embodiment, the NCIA 112B may be integrated within a router of a communication network. FIG. 6 illustrates another embodiment of a communication network 600. The communication network 600 includes a television receiver 106, a presentation device 108, a telephone network 110, a clock 504, a kitchen appliance 508, a computer 510, a router 602, the internet 604 and the external server 606. Each of these components is discussed in greater detail below. The communication network 600 may include other components, elements of devices not illustrated for the sake of brevity and the discussion of components common to FIGS. 1-4 is omitted herein.

The router 602 is operable to route traffic between various devices, such as the television receiver 106, the clock 504, the kitchen appliance 508, the computer 510 and the external server 606. In the illustrated embodiment, the router 602 includes a WAN interface, allowing the router to couple other devices to the external server 606 via the internet 604. However, it is to be appreciated that the router may also be communicatively coupled to an external WAN interface, such as a cable modem or DSL modem that connects the router 602 with the internet 604.

The router 602 is communicatively coupled to the telephone network 110 and able to receive phone calls and extract caller identification information for transmission to various devices. The router 602 identifies which devices are configured to output the caller identification information and transmits the caller identification information to the devices responsive to a phone call. Thus, the various devices, such as the television receiver 106, the clock 504, the kitchen appliance 508 and the computer 510 may present caller identification information to a user without directly coupling to the telephone network 110.

Figure 7:
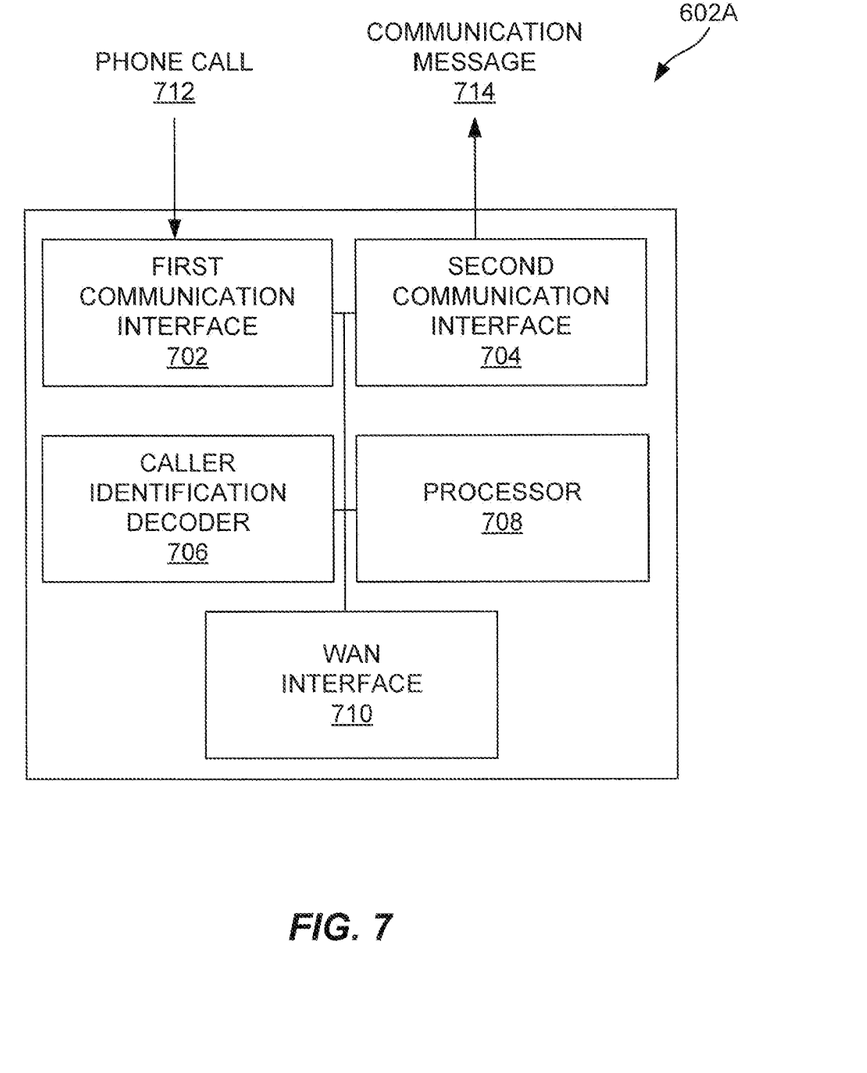
FIG. 7 illustrates an embodiment of a router of FIG. 6.

FIG. 7 illustrates an embodiment of a router of FIG. 6. The router 602A will be described in reference to the communication network 600 of FIG. 6. The router includes a first communication interface 702, a second communication interface 704, a caller identification decoder 706, a processor 708 and a WAN interface 710. Each of these components is discussed in greater detail below. The router 602A may include other devices, elements or components not illustrated for the sake of brevity.

The first communication interface 702 communicatively couples the router 602A to a telephone network 110 to receive a phone call 712. The first communication interface 702 may be similar to the first communication interface 202 illustrated in FIGS. 2-3. The caller identification decoder 706 is operable to process the phone call 712 to extract caller identification information and may be similar to the caller identification decoder 306.

The second communication interface 704 is operable to communicatively couple to multiple communication devices, such as the television receiver 106, the clock 504, the kitchen appliance 508 and the computer 510. In at least one embodiment, the second communication interface 704 includes multiple physical data ports, such as multiple Ethernet ports for receiving Ethernet connectors from various devices. In other embodiments, the second communication interface 704 may include one or more wireless transceivers, such as WiFi transceivers to communication with various devices.

The WAN interface 710 is operable to communicatively couple the router 602 to an external network, such as the internet. The WAN interface 710 may include circuitry operable to receive/demodulate and transmit/modulate information which is transmitted over any type of communication medium. For example, the WAN interface 710 may communicatively couple to a DSL network, a DOCSIS network, a wireless network or a fiber network depending on desired design criteria.

The processor 708 is operable to control the operation of the router 602A. The processor 708 may be a single processing device or a plurality of processing devices that cooperatively operate to control the operation of the router 602A. The processor 708 may include various components or modules for communicating over telephone and data networks and routing traffic between various devices.

The processor 708 is operable to route traffic between two devices on a local area network, such as the television receiver 106 and the computer 510. In at least one embodiment, the processor 708 is operable to route traffic between a local device and an external device, such as the television receiver 106 and the external server 606 via the internet 605. The processor 708 is also operable to identify whether any particular communication device connected thereto is configured to output caller identification information. This may be done for example when the device is first connected to the second communication interface 704, e.g., through a UPnP discovery process or via a direct query to the device. For example, the television receiver 106 may be operable to receive caller identification information and the processor 708 may identify the same in messages transmitted from the television receiver 106.

Responsive to a phone call, the caller identification decoder 706 extracts caller identification information and provides the same to the processor 708. The processor 708 generates a communication message 714 based on the caller identification information and initiates transmission of the communication message 714 to the television receiver 106 (and other devices is appropriate) via the second communication interface 704.

Figure 8:
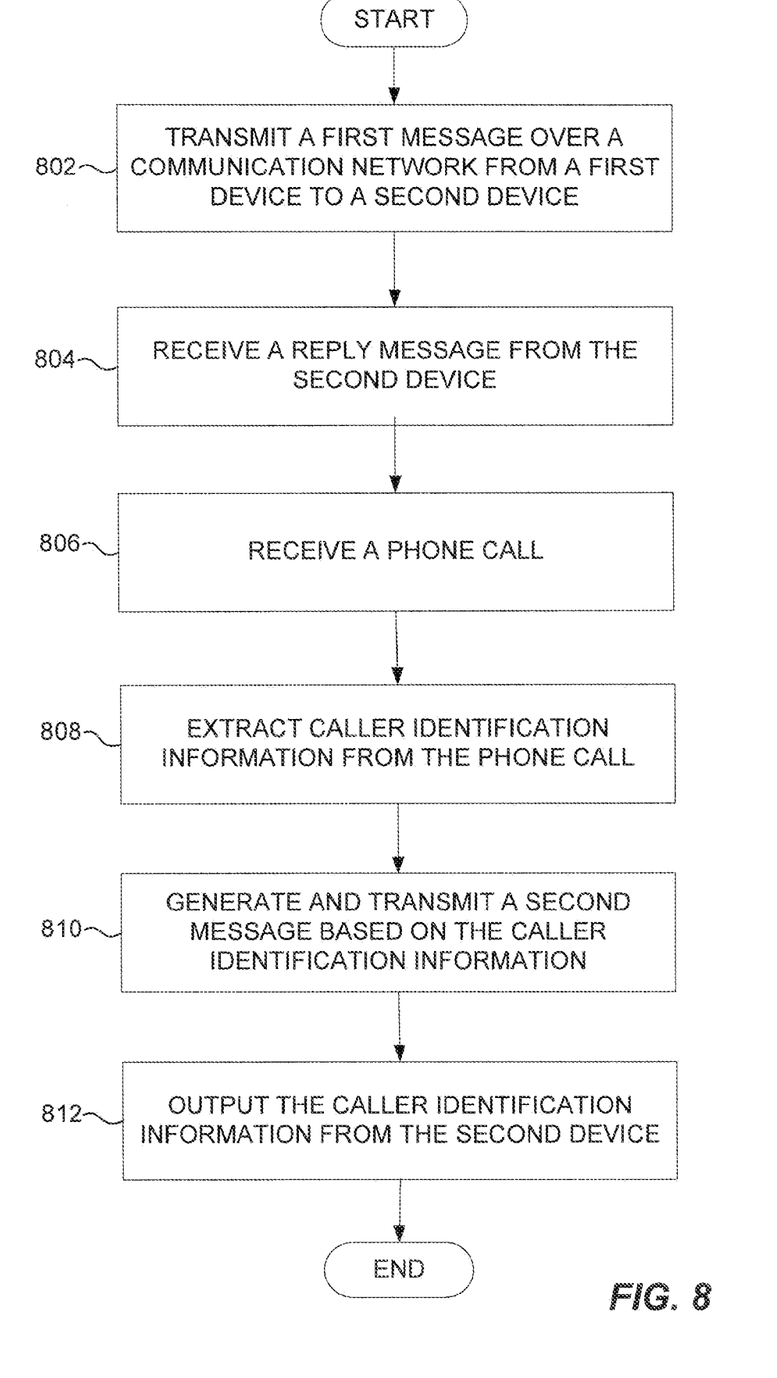
FIG. 8 illustrates an embodiment of a process for transmitting caller identification information through a network.

FIG. 8 illustrates an embodiment of a process for transmitting caller identification information through a network. More particularly, the method of FIG. 8 illustrates an embodiment of a method for transmitting caller identification information from a device communicatively coupled to a telephone network to another device not communicatively coupled to the telephone network. The process of FIG. 8 may include other operations not illustrated for the sake of brevity.

The process includes transmitting a first message over a communication network from a first device to a second device (operation 802). The first message identifies a communication service offered by the first device, which is communicatively coupled to a telephone network. More particularly, the communication service includes transmission of caller identification information from the first device to the second device.

The process further includes receiving a reply message at the first device from the second device (operation 804). The reply message from the second device requests the communication service from the first device. In at least one embodiment, operations 802 and 804 may be performed as part of a discovery process.

The process further includes receiving a phone call (operation 806) and extracting caller identification information from the phone call (operation 808). The process further includes generating a second message based on the caller identification information and transmitting the second message from the first device to the second device (operation 810). The process further includes outputting the caller identification information from the second device responsive to the second message (operation 812).

Although specific embodiments were described herein, the scope of the invention is not limited to those specific embodiments. The scope of the invention is defined by the following claims and any equivalents therein.

I claim:

1. An apparatus for use on customer premises, the apparatus comprising:
    a first communication interface that directly and communicatively couples to a telephone line at the customer premises to receive a phone call intended for the customer, wherein the telephone line provides POTS (plain old telephone service) to the customer's premises;
    a second communication interface that communicatively couples to a local area network at the customer premises to communicate with a device, wherein the device is separate from the apparatus but is located at the customer premises and is operable to communicate with the apparatus via the local area network; and
    control logic communicatively coupled to the first and second communication interfaces, the control logic operable to:
        prior to receiving the phone call, broadcast a first message over the communication network, the first message identifying a communication service offered by the apparatus that provides caller identification information for incoming telephone calls via the local area network;
        receive, in response to the first message, a reply message from the device, the reply message requesting the communication service from the apparatus;
        subsequent to receiving the reply message from the device, process the phone call received on the telephone line to extract the caller identification information;
        generate a second message that includes the caller identification information identifying a caller who initiated the phone call; and
        transmit the second message including the caller information to the device via the local area network, wherein the device processes the second message to output the caller identification information to the customer on a display.

2. The apparatus of claim 1, wherein the telephone line provides POTS service to the customer's premises.

3. The apparatus of claim 2, wherein the separate device is a television receiver that receives television broadcasts via a medium that is separate from the POTS service and that is not received into the apparatus.

4. The apparatus of claim 3 wherein the separate device is a set top box that receives satellite television broadcasts.

5. The apparatus of claim 1, wherein the second communication interface comprises a wired Ethernet connection.

6. The apparatus of claim 1, wherein the second communication interface comprises a wireless local area network connection.

7. The apparatus of claim 2 wherein the control logic comprises:
    a caller identification decoder operable to extract the caller identification information from the POTS service delivered to the customer premises.

8. A router for use at customer premises, the router comprising:
- a first communication interface that directly and communicatively couples to a telephone line at the customer premises to receive a phone call intended for the customer, wherein the telephone line provides POTS service to the customer's premises;
- a second communication interface that communicatively couples to first and second communication devices via a local area network, wherein the first and second communication devices also operate at the customer premises;
- control logic, comprising a caller identification decoder operable to extract caller identification information directly from the POTS service, and configured to communicate with the first and second communication devices via the second communication interface, the control logic operable to:
  - route traffic to the first and second communication devices on the local area network;
  - prior to receiving the telephone call, identify whether the first communication device is configured to output caller identification information;
  - subsequent to identifying process the phone call to extract the caller identification information;
  - generate a first message in response to the phone call that includes the caller identification information if the first communication device is configured to output the caller identification information; and
  - transmit the first message to the first communication device if the first communication device is configured to output the caller identification information, wherein the first communication device receives the first message and outputs the caller identification information to the customer.

9. The router of claim 8, wherein the control logic is further operable to, prior to receiving the telephone call:
- broadcast a second message on the local area network to the first and second communication devices, the second message identifying a communication service offered by the apparatus that provides caller identification information for incoming telephone calls via the local area network, and
- receive a reply message to the second message from the first device via the local area network, the reply message requesting the communication service from the router, the control logic operating to generate the first message responsive to the phone call based on the reply message.

10. The router of claim 8, wherein the first device comprises a television receiver.

11. The router of claim 10, wherein the television receiver comprises a satellite television receiver.

12. The router of claim 8, wherein the second communication interface is communicatively coupled to the first device through a wired connection.

13. The router of claim 8, wherein the second communication interface is communicatively coupled to the first device through a wireless connection.

14. A system for notifying a customer who is watching television programming of an incoming phone call, the system comprising:
- a television receiver located at the customer premises, the television receiver including:
  - a first communication interface operable to receive the television programming from a broadcast source;
  - a second communication interface communicatively coupled to a local area network that operates within the customer premises; and
  - first control logic communicatively coupled to the first and second communication interfaces and to a presentation device, the first control logic operable to output the television programming to the presentation device; and
- an apparatus also located at the customer premises, the apparatus comprising:
  - a third communication interface that directly and communicatively couples to a telephone line that is separate from the broadcast source to receive a phone call intended for the customer, wherein the telephone line provides POTS service to the customer's premises, and wherein the telephone line is a medium that is separate from the broadcast source;
  - a fourth communication interface that communicates with to the television receiver through the local area network;
  - second control logic communicatively coupled to the third and fourth communication interfaces, the control logic operable to:
    - prior to receiving the phone call, broadcast a first message to on the local area network, the first message identifying a communication service offered by the apparatus that provides caller identification information for incoming telephone calls via the local area network;
    - receive, in response to the first message, a reply message from the television receiver via the local area network, the reply message requesting the communication service from the apparatus;
    - subsequent to receiving the replay message from the device, process the phone call to extract caller identification information;
    - in response to the phone call, generate a second message that includes the extracted caller identification information; and
    - transmit the second message including the caller identification information to the television receiver via the local area network;
- wherein the second communication interface is operable to receive the second message including the caller identification information from the apparatus, wherein the first control logic is operable to output the caller identification information with the television programming for presentation by the presentation device responsive to the second message to thereby notify the customer who is watching the television programming of the incoming phone call, and wherein the second control logic extracts the caller identification information from the POTS service.

15. The system of claim 14, wherein the apparatus is integrated within a router, the router including a wide area network interface operable to communicatively couple the television receiver to an external network separate from the local area network.

16. The router of claim 14, wherein the television receiver comprises a satellite television receiver.

17. The apparatus of claim 14, wherein the second control logic comprises:
- a caller identification decoder operable to extract the caller identification information; and
- a microcontroller operable to control communication with the television receiver and the apparatus.

* * * * *